United States Patent
Liu et al.

(10) Patent No.: US 12,501,089 B2
(45) Date of Patent: Dec. 16, 2025

(54) PATH VERIFICATION METHOD IN CONTENT DELIVERY NETWORK, AND DEVICE

(71) Applicant: Beijing Volcano Engine Technology Co., Ltd., Beijing (CN)

(72) Inventors: Senzhen Liu, Beijing (CN); Yang Yang, Beijing (CN); Xingwei Liao, Beijing (CN); Xiongqin Hu, Beijing (CN); Hao Wu, Beijing (CN); Wei Shan, Beijing (CN); Jian Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 19/079,971

(22) Filed: Mar. 14, 2025

(65) Prior Publication Data

US 2025/0301191 A1    Sep. 25, 2025

(30) Foreign Application Priority Data

Mar. 21, 2024  (CN) .......................... 202410330088.7

(51) Int. Cl.
  *H04N 21/24* (2011.01)
(52) U.S. Cl.
  CPC ..... *H04N 21/2402* (2013.01); *H04N 21/2408* (2013.01)
(58) Field of Classification Search
  CPC .................. H04N 21/2402; H04N 21/2408
  See application file for complete search history.

(56) References Cited

U.S. PATENT DOCUMENTS

| | | | |
|---|---|---|---|
| 12,095,855 B2* | 9/2024 | Desmouceaux | H04L 69/164 |
| 2010/0030808 A1* | 2/2010 | Ress | H04N 21/4333 |
| | | | 709/227 |

(Continued)

FOREIGN PATENT DOCUMENTS

| CN | 107426102 A | 12/2017 |
|---|---|---|
| CN | 110999252 A | 4/2020 |

(Continued)

OTHER PUBLICATIONS

China National Intellectual Property Administration, Search Report Issued in Application No. 202410330088.7, Apr. 28, 2024, 1 page.

(Continued)

*Primary Examiner* — Javier O Guzman
(74) *Attorney, Agent, or Firm* — Alleman Hall & Tuttle LLP (57) ABSTRACT

The present disclosure provides a path verification method in a content delivery network, and a device. The method includes: sending, by a client end, a first connection identification frame to a service end, the first connection identification frame comprising a current communication address of the client end; receiving, by the client end, a second connection identification frame fed back by the service end for the first connection identification frame, the second connection identification frame comprising a candidate communication address of the service end; for any candidate communication address, sending, by the client end, a path verification frame to the service end on a new path constructed based on the current communication address and the candidate communication address; and receiving, by the client end, a path response frame fed back by the service end through a target path obtained by filtering, to complete uplink verification of the new path.

20 Claims, 6 Drawing Sheets

(56) References Cited

U.S. PATENT DOCUMENTS

| | | | | |
|---|---|---|---|---|
| 2019/0319873 | A1* | 10/2019 | Shelar | H04L 43/08 |
| 2020/0120555 | A1* | 4/2020 | Patil | H04W 76/22 |
| 2022/0124560 | A1* | 4/2022 | Yeh | H04L 41/5025 |
| 2022/0248296 | A1* | 8/2022 | Merwaday | H04W 48/18 |
| 2023/0118793 | A1* | 4/2023 | Shastri | H04N 21/2312 |
| | | | | 709/219 |
| 2023/0354152 | A1* | 11/2023 | Bangolae | H04W 40/22 |
| 2024/0259857 | A1* | 8/2024 | Zhu | H04W 28/0263 |

FOREIGN PATENT DOCUMENTS

| | | |
|---|---|---|
| CN | 112738855 A | 4/2021 |
| CN | 115037671 A | 9/2022 |
| CN | 115529255 A | 12/2022 |
| CN | 116112436 A | 5/2023 |
| CN | 117938550 A | 4/2024 |

OTHER PUBLICATIONS

Liu, T. et al., "A Reliable Transport Protocol Based on UDP Protocol with Hybrid Feedback Mechanism," Modern Computer, Issue 5, Feb. 2017, May 25, 2017, 5 pages. (Submitted with English abstract).

European Patent Office, Extended European Search Report Issued in Application No. 25163640.3, Jul. 21, 2025, Germany, 13 pages.

Seemann, M. et al., "Using QUIC to traverse NATs," Internet Engineering Task Force, Available Online at https://datatracker.ietf.org/doc/draft-seemann-quic-nat-traversal/, Mar. 4, 2024, 10 pages.

Liu, Y. et al., "Multipath Extension for QUIC," Internet Engineering Task Force, Available Online at https://datatracker.ietf.org/doc/draft-ietf-quic-multipath/06/, Oct. 23, 2023, 23 pages.

* cited by examiner

PATH VERIFICATION METHOD IN CONTENT DELIVERY NETWORK, AND DEVICE

CROSS-REFERENCE TO RELATED APPLICATION(S)

This application claims priority to Chinese Application No. 202410330088.7 filed on Mar. 21, 2024, the disclosure of which is incorporated herein by reference in its entirety.

TECHNICAL FIELD

The present disclosure relates to the field of communication technology, and in particular, to a path verification method in a content delivery network, and a device.

BACKGROUND

Multipath QUIC (MPQUIC) is a multipath transfer protocol based on Quick UDP Internet Connection (QUIC). In a content delivery network, MPQUIC can transmit data simultaneously on multiple network paths, thereby improving the reliability and efficiency of data transmission. When one path has a problem, other paths can continue to transmit data, thereby avoiding a connection interruption, and thus the MPQUIC has a good application prospect in a mobile device and a network with multiple network interfaces.

SUMMARY

The present disclosure provides a path verification method in a content delivery network. The method includes: sending, by a client end, a first connection identification frame to a service end, the first connection identification frame comprising a current communication address of the client end; receiving, by the client end, a second connection identification frame fed back by the service end for the first connection identification frame, the second connection identification frame comprising a candidate communication address of the service end; for any candidate communication address, sending, by the client end, a path verification frame to the service end on a new path constructed based on the current communication address and the candidate communication address; and receiving, by the client end, a path response frame fed back by the service end through a target path obtained by filtering, to complete uplink verification of the new path, where the target path is obtained by filtering, by the service end, a plurality of candidate paths.

The present disclosure further provides a client end. The client end includes: a first sending unit, configured to send a first connection identification frame to a service end, the first connection identification frame comprising a current communication address of the client end; a first receiving unit, configured to receive a second connection identification frame fed back by the service end for the first connection identification frame, the second connection identification frame comprising a candidate communication address of the service end; a second sending unit, configured to, for any candidate communication address, send a path verification frame to the service end on a new path constructed based on the current communication address and the candidate communication address; and a second receiving unit, configured to receive a path response frame fed back by the service end through a target path obtained by filtering, to complete uplink verification of the new path, where the target path is obtained by filtering, by the service end, a plurality of candidate paths.

The present disclosure further provides a path verification method in a content delivery network. The method includes: receiving, by a service end, a first connection identification frame sent by a client end, the first connection identification frame comprising a current communication address of the client end; feeding back, by the service end, a second connection identification frame to the client end for the first connection identification frame, the second connection identification frame comprising a candidate communication address of the service end; receiving, by the service end, a path verification frame sent by the client end on a new path to be verified, the new path being constructed based on the current communication address and the candidate communication address; and filtering, by the service end, a target path from a plurality of candidate paths, and feeding back a path response frame to the client end through the target path, to complete uplink verification of the new path.

The present disclosure further provides a service end. The service end includes: a third receiving unit, configured to receive a first connection identification frame sent by a client end, the first connection identification frame comprising a current communication address of the client end; a third sending unit, configured to feed back a second connection identification frame to the client end for the first connection identification frame, the second connection identification frame comprising a candidate communication address of the service end; a fourth receiving unit, configured to receive a path verification frame sent by the client end on a new path to be verified, the new path being constructed based on the current communication address and the candidate communication address; and a fourth sending unit, configured to filter a target path from a plurality of candidate paths, and feed back a path response frame to the client end through the target path, to complete uplink verification of the new path.

The present disclosure further provides an electronic device. The electronic device includes a memory and a processor, the memory being configured to store a computer program, the computer program, when executed by the processor, implementing the path verification method in the content delivery network described above.

The present disclosure further provides a computer-readable storage medium. The computer-readable storage medium is configured to store a computer program, the computer program, when executed by a processor, implementing the path verification method in the content delivery network described above.

BRIEF DESCRIPTION OF THE DRAWINGS

The features and advantages of various embodiments of the present disclosure will be more clearly understood by referring to the drawings, which are intended to be illustrative and not to limit the present disclosure. In the drawings.

DETAILED DESCRIPTION

In order to make the purpose, technical solutions and advantages of the embodiments of the present disclosure clearer, the technical solutions in the embodiments of the present disclosure will be clearly and completely described below in combination with the drawings in the embodiments of the present disclosure. Obviously, the described embodiments are part of the embodiments of the present disclosure, but not all of them. Based on the embodiments in the present disclosure, all other embodiments obtained by those skilled in the art without creative efforts fall within the protection scope of the present disclosure.

MPQUIC address verification is a path verification mechanism, which verifies whether data packages sent to a peer on a new path can be received by the peer. At present, when path verification is performed in a content delivery network, data frames are usually transmitted in an established path. However, due to the instability of the network state, the established path may have poor data transmission, which in turn affects the efficiency of path verification in the content delivery network.

In view of this, one or more embodiments of the present disclosure provide a path verification method in a content delivery network, and a device, which can improve the efficiency of path verification in the content delivery network. According to the technical solution provided by one or more embodiments of the present disclosure, after a client end sends a path verification frame to a service end on a new path to be verified, the service end may filter, based on an actual network transmission situation, a target path that satisfies a condition for transmission state from a plurality of candidate paths, and then feed back a path response frame to the client end through the target path, thereby completing the process of uplink verification for the new path. By dynamically selecting a feedback path for the path response frame, the success rate and speed of receiving the path response frame by the client end can be ensured, thereby improving the efficiency and stability of path verification in a content delivery network.

Figure 1:
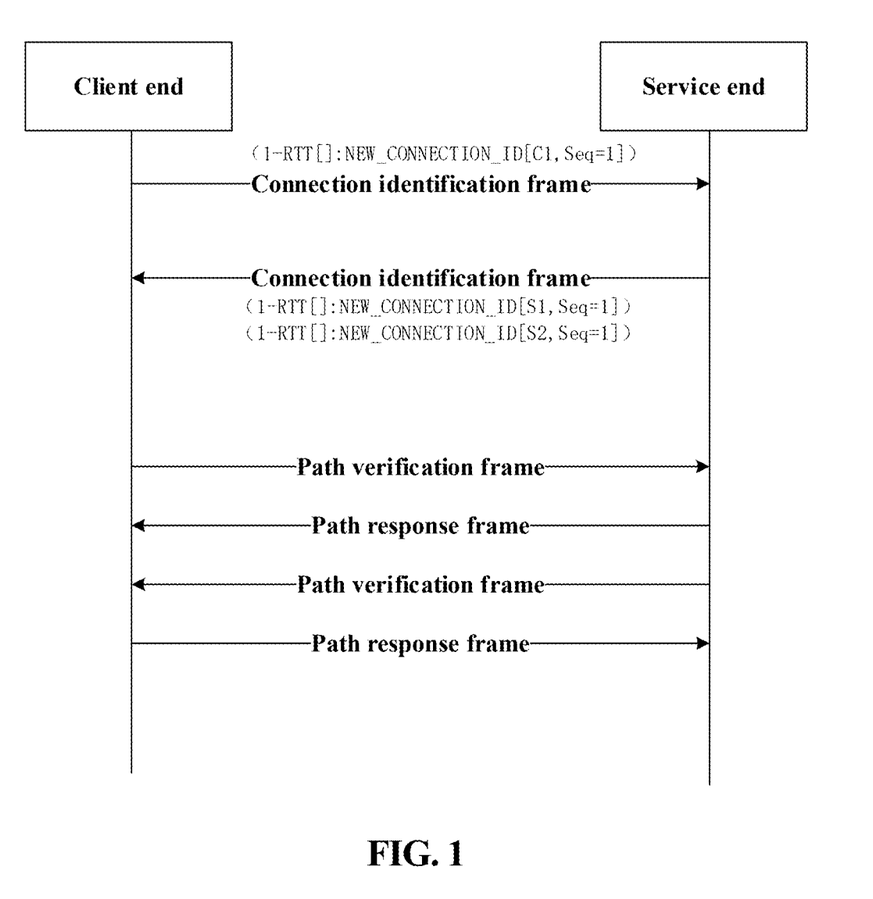
FIG. 1 is a schematic diagram of a path verification method in a content delivery network in the related art.

Referring to FIG. 1, in the related art, MPQUIC address verification in a content delivery network may include the following steps.

Step 1: after a client end and a service end complete a TCP/IP handshake process, the client end may send a connection identification frame to the service end, and the connection identification frame may carry a communication address of the client end (for example, in FIG. 1, the communication address of the client end may be represented by C1).

Step 2: after receiving the connection identification frame, the service end may also feed back a connection identification frame to the client end, and the connection identification frame may carry multiple communication addresses currently available to the service end (for example, in FIG. 1, two communication addresses available to the service end may be represented by S1 and S2).

Step 3: after the client end and the service end inform each other of their respective communication addresses, the client end may send a path verification frame on a path to be verified. For example, in FIG. 1, the path to be verified may be composed of the communication address C1 of the client end and the communication address S2 of the service end, and the client end may send the path verification frame through this path.

Step 4: after receiving the path verification frame through the path to be verified, the service end may check information in the path verification frame, and if the information is correct, the service end may feed back a path response frame to the client end through the path to be verified.

Step 5: after receiving the path response frame by the client end, it can indicate that the uplink path from the client end to the service end in the path to be verified has been verified.

Subsequently, the service end may complete the downlink verification of the path to be verified in a similar way.

It is not difficult to find that in the above related art, the path verification frame and the path response frame are transmitted on the same path (the path to be verified). However, in some scenarios, with the fluctuation of the network environment in the content delivery network, when the service end feeds back the path response frame to the client end, the downlink path in the path to be verified may not have a good communication condition, which may result in the whole path verification being affected.

Figure 2:
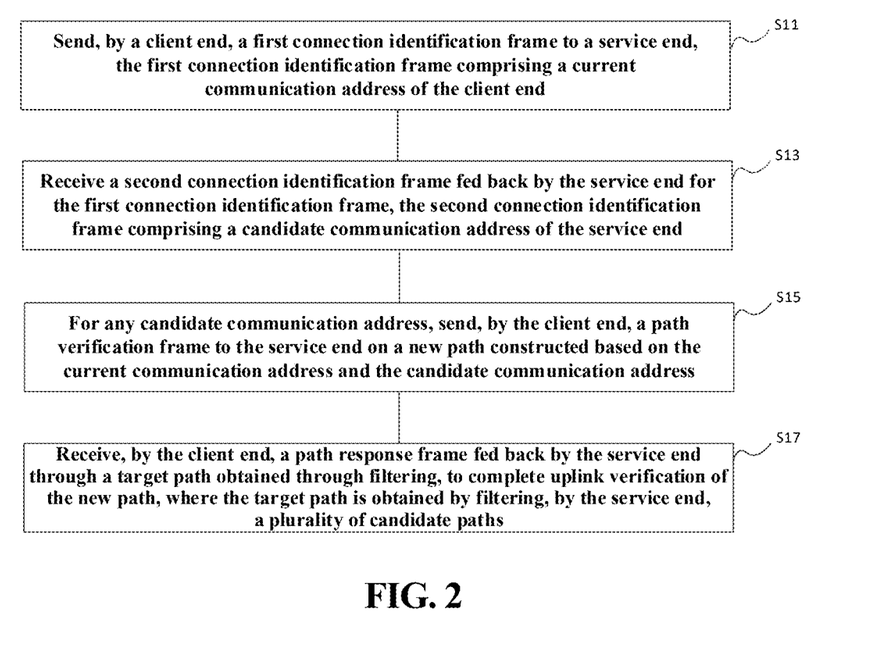
FIG. 2 is a schematic diagram of steps of a path verification method in a content delivery network performed by a client end according to embodiments of the present disclosure.
Figure 3:
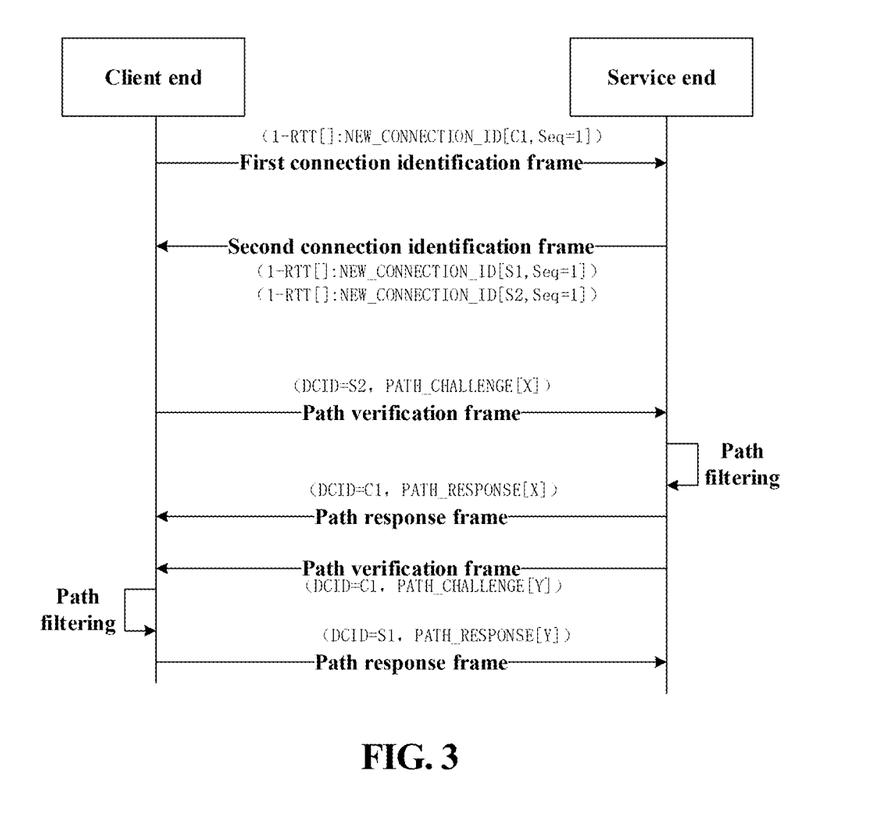
FIG. 3 is a schematic diagram of interaction in a path verification method in a content delivery network according to embodiments of the present disclosure.

In view of this, embodiments of the present disclosure provide a path verification method in a content delivery network. Referring to FIG. 2 and FIG. 3, the method may include the following steps.

S11: sending, by a client end, a first connection identification frame to a service end, the first connection identification frame comprising a current communication address of the client end.

In this embodiment, before path verification of a content delivery network is performed, the client end and the service end may perform a three-way handshake. After the three-way handshake process is completed, network parameters such as latency and packet loss rate between each communication address of the client end and each communication address of the service end may be obtained. Based on the obtained network parameters, a communication quality assessment may be performed on possible communication paths between the client end and the service end.

For example, if a communication address currently available to the client end is C1, and communication addresses currently available to the service end are S1 and S2, communication links between the client end and the service end may include at least two communication links: [C1, S1] and [C1, S2]. [C1, S1] denotes that the communication address of one end of the path is C1, and the communication address of the other end is S1. Similarly, [C1, S2] denotes that the communication address of one end of the path is C1, and the communication address of the other end is S2.

After the client end and the service end complete the three-way handshake process, assuming that it can be inferred, according to the network parameters, that the communication quality of the path [C1, S1] is better than that of the path [C1, S2], the assessment result for the communication quality will affect the transmission rule for data frames in a subsequent path verification process.

In this embodiment, after the client end and the service end complete the handshake process and determine the assessment result of the communication quality between different paths, the client end may start a process of path verification.

In this embodiment, at the beginning stage of path verification, the client end and the service end may inform each other of the currently available communication address. Specifically, the client end may send a first connection identification frame (NEW_CONNECTION_ID frame) to the service end in a default path. The default path may be a path without a need for path verification. For example, one end of the default path may be the communication address C0 of the client end, and the other end may be the communication address S0 of the service end. The current communication address of the client end may be carried in the first connection identification frame. The current communication address may be a communication address of the client end that needs to be verified. For example, the current communication address may be C1.

S13: receiving, by the client end, a second connection identification frame fed back by the service end for the first connection identification frame, the second connection identification frame comprising a candidate communication address of the service end.

In this embodiment, after receiving the first connection identification frame sent by the client end through the default path, the service end may parse a communication address of the client end that needs to be verified subsequently from the first connection identification frame. Then, in response to the first connection identification frame, the service end may feed back a second connection identification frame (still a NEW_CONNECTION_ID frame) to the client end. The second connection identification frame may carry a candidate communication address of the service end. The candidate communication address may be a communication address of the service end that needs to be verified. For example, the candidate communication address may be S1 and S2.

In an embodiment, the above first connection identification frame and second connection identification frame may be located in the same packet number space. For example, in FIG. 3, the first connection identification frame and the second connection identification frame may both be located in a packet number space of 1-RTT. However, in the same packet number space, in order to ensure the independence of data transmission, different candidate communication addresses may be located in different second connection identification frames. For example, the service end may feed back two second connection identification frames, which respectively carry the above candidate communication addresses S1 and S2, and different sequence numbers may be added to different second connection identification frames according to the creation order of the data frames. For example, the two second connection identification frames in FIG. 3 may respectively carry sequence numbers 1 and 2 (Seq=1 and Seq=2).

S15: for any candidate communication address, sending, by the client end, a path verification frame to the service end on a new path constructed based on the current communication address and the candidate communication address.

In this embodiment, after the client end and the service end inform each other of their respective communication addresses, a subsequent stage of path verification may be performed. Each path to be verified between the client end and the service end may proceed to the subsequent stage of path verification. Taking one new path [C1, S2] to be verified as an example, the two communication addresses that constitute the new path are C1 and S2 respectively, where C1 is the current communication address of the client end side, and S2 is the candidate communication address of the service end side. That is to say, a new path to be verified may be constructed based on the current communication address and a candidate communication address.

For the above new path [C1, S2] to be verified, the client end may send a path verification frame (PATH_CHALLENGE[X] frame) to the service end over the new path, and the path verification frame sent by the client end may be used to verify whether the uplink path from the client end to the service end satisfies the communication requirement, where X may indicate that the current path verification frame is used to verify the uplink path. In practical applications, the destination address carried in the path verification frame initiated by the client end may be the candidate communication address (S2) of the service end side of the new path to be verified, which may be represented by a field such as DCID=S2.

S17: receiving, by the client end, a path response frame fed back by the service end through a target path obtained by filtering, to complete uplink verification of the new path, where the target path is obtained by filtering, by the service end, a plurality of candidate paths.

In this embodiment, after receiving the path verification frame sent by the client end, in order to improve the stability and efficiency of path verification, the service end may filter, after confirming that the content in the path verification frame is correct, a target path with optimal communication quality based on the assessment result of the communication quality of each path obtained in the foregoing steps, and then feed back a path response frame (PATH_RESPNSE frame) to the client end on the target path.

For example, if the current new path to be verified is [C1, S2], after the client end sends the path verification frame to the service end over the new path, the service end determines that the communication quality of the path [C1, S1] is better than that of the path [C1, S2], and then the service end may feed back the path response frame to the client end over the path [C1, S1], instead of feeding back the path response frame through the path [C1, S2]. That is to say, the communication address where the service end receives the path verification frame is S2, but the communication address where the path response frame is sent for the path verification frame is S1.

The purpose of such processing is that, in the process of verifying the uplink path, it only needs to be ensured that the path verification frame sent by the client end actually corresponds to the new path to be verified, while after the service end confirms that the content of the path verification frame is correct, the service end does not necessarily feed back the path response frame on the new path to be verified. In view of this, in this embodiment, the service end feeds back the path response frame to the client end over the target path with optimal communication quality, so that the stability and efficiency of the verification process of the uplink path can be ensured.

In an embodiment, based on various network parameters between the client end and the service end, a path latency of each path between the client end and the service end may be calculated, and then the paths are sorted in an ascending order of the path latency, so as to filter a minimum latency path, and use the minimum latency path as the target path for transmitting the path response frame.

In this embodiment, after the client end receives the path response frame fed back by the service end through the target path, the verification process of the uplink path in the new path to be verified may be completed.

It can be understood that the above new path and target path each include an uplink path and a downlink path, where the client end may send the path verification frame to the service end through the uplink path of the new path, and the client end may receive the path response frame sent by the service end through the downlink path of the target path.

Subsequently, the downlink path in the new path to be verified also needs to be verified in a similar way. Specifically, the service end may send a path verification frame (PATH_CHALLENGE[Y] frame) to the client end over the new path to be verified, where Y may indicate that the path verification frame is used to verify the downlink path. Since the current new path to be verified is [C1, S2], the path verification frame sent by the service end is sent from the communication address S2, and the destination address is the communication address C1 of the client end, which may be represented by DCID=C1.

Similarly, after receiving the path verification frame sent by the service end, the client end may filter a path with optimal communication quality from a plurality of candidate paths, and feed back a path response frame to the service end over the path with optimal communication quality. In an embodiment, based on various network parameters between the client end and the service end, the client end may calculate a path latency of each path between the client end and the service end, and then sort the paths in an ascending order of the path latency, and determine a path corresponding to a minimum path latency as the filtered target path. For example, if the communication quality of the path [C1, S1] is better than that of the path [C1, S2], when the client end feeds back the path response frame to the service end, the destination address is S1 instead of S2. That is to say, the service end sends the path verification frame from the communication address S2, but receives the path response frame from the communication address S1.

In the specific stages of steps S15 and S17, although these two stages are different from the stage of informing each other of communication addresses in steps S11 and S13, these two stages both belong to the process of path verification, so these two stages may be performed in the same packet number space 1-RTT. That is to say, the above first connection identification frame, second connection identification frame, path verification frame and path response frame may all be transmitted in the same packet number space.

After the client end and the service end complete the verification of the uplink path and the downlink path respectively, the verification process of the new path to be verified in the content delivery network is completed.

In an embodiment, the communication quality of each path between the client end and the service end may be represented in a more detailed way. In the foregoing embodiment, the communication quality of a path may represent the overall communication quality of a round-trip path composed of an uplink path and a downlink path. For example, when the communication quality of the path [C1, S1] is represented by using the path latency, the sum of the latencies of two unidirectional paths from C1 to S1 and from S1 to C1 is calculated. In order to further improve the efficiency of path verification, the uplink path and the downlink path may be used as two independent unidirectional paths to determine the communication quality separately. In this way, the two paths in the foregoing embodiments may be split into four independent unidirectional paths in a subsequent process of determining the communication quality.

Specifically, similar to the foregoing embodiment, the client end and the service end may still perform a handshake process first, and after the handshake, network parameters between the client end and the service end may be obtained. Based on the obtained network parameters, the communication quality of each unidirectional path between the client end and the service end may be determined. For example, for the path [C1, S1] (represented by Path 1) and the path [C1, S2] (represented by Path 2), they may be split into four independent unidirectional paths:

U(Path 1), U(Path 2), D(Path 1), D(Path 2)

The above four unidirectional paths respectively represent the uplink path of Path 1, the uplink path of Path 2, the downlink path of Path 1, and the downlink path of Path 2. The communication quality of each unidirectional path may be determined in a similar way. For example, a path latency of each unidirectional path may be calculated separately, and the communication quality of the unidirectional path may be represented by using the path latency. The smaller the path latency, the better the communication quality.

In this embodiment, after completing the handshake, the client end and the service end may still inform each other of the available communication addresses according to the manner of steps S11 and S13. For a new path to be verified (taking [C1, S2] as an example), the client end may still send a path verification frame to the service end through the uplink path of the new path according to the manner of step S15, where in the path verification frame, the source address may be C1, and the destination address may be S2.

After confirming that the path verification frame is correct, the service end may filter, according to the communication quality of each unidirectional path, a downlink path with optimal current communication quality, and feed back a path response frame to the client end through the downlink path.

The difference from the foregoing embodiments is that, when selecting a path for feeding back the path response frame, the service end selects from a finer granularity of the unidirectional path, instead of only according to the overall communication quality of the round-trip path. Assuming that the communication quality relationship among the above four unidirectional paths is as follows:

U(Path 1) is better than U(Path 2), and D(Path 2) is better than D(Path 1)

If the current path to be verified is Path 2 [C1, S2], the client end sends the path verification frame to the service end through U(Path 2), and after confirming that the path verification frame is correct, the service end may feed back the path response frame to the client end through D(Path 2) with better communication quality. In this scenario, both the path verification frame and the path response frame are actually transmitted through Path 2. Although the overall round-trip communication quality of Path 2 may be lower than that of Path 1, the downlink path of Path 2 has better communication quality for the unidirectional downlink path. Therefore, when feeding back the path response frame to the client end, the service end may select the downlink path of Path 2. That is to say, each of the plurality of candidate paths includes an uplink path and a downlink path, and the target path may be obtained by the service end through filtering among downlink paths.

Similarly, when the service end verifies the downlink path of Path 2, the service end sends a path verification frame to the client end through D(Path 2), and after determining that the content of the path verification frame sent by the service end is correct, the client end may select U(Path 1) with better communication quality to feed back a path response frame to the service end. That is to say, after receiving the path verification frame sent by the service end through the new path, in response to the path verification frame, the client end may filter an optimal uplink path from the uplink paths of the plurality of candidate paths, and feed back the path response frame to the service end through the optimal uplink path, to complete the downlink verification of the new path in the content delivery network.

Specifically, when filtering the optimal uplink path, the client end may calculate a path latency of each of the uplink paths of the plurality of candidate paths, and use an uplink path corresponding to a minimum path latency as the filtered optimal uplink path.

According to the above embodiments, after a client end sends a path verification frame to a service end on a new path to be verified, the service end may filter, based on an actual network transmission situation, a target path that satisfies a condition for transmission state from a plurality of candidate paths, and then feed back a path response frame to the client end through the target path, thereby completing the process of uplink verification for the new path.

Similarly, when the service end performs downlink verification for the new path, the client end may also select, based on an actual network transmission situation, a path that satisfies a condition, and then feed back a path response frame on the selected path, thereby completing the verification of the downlink path in the content delivery network.

By dynamically selecting a feedback path for the path response frame, the success rate and speed of receiving the path response frame by the client end can be ensured, thereby improving the efficiency and stability of path verification in a content delivery network.

Figure 4:
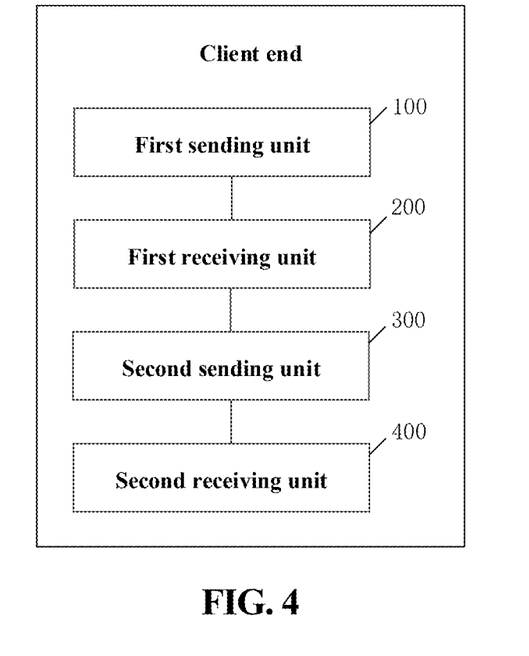
FIG. 4 is a schematic diagram of functional modules of a client end according to embodiments of the present disclosure.

Referring to FIG. 4, embodiments of the present disclosure further provide a client end. The client end includes:
- a first sending unit 100, configured to send a first connection identification frame to a service end, the first connection identification frame comprising a current communication address of the client end;
- a first receiving unit 200, configured to receive a second connection identification frame fed back by the service end for the first connection identification frame, the second connection identification frame comprising a candidate communication address of the service end;
- a second sending unit 300, configured to, for any candidate communication address, send a path verification frame to the service end on a new path constructed based on the current communication address and the candidate communication address; and
- a second receiving unit 400, configured to receive a path response frame fed back by the service end through a target path obtained by filtering, to complete uplink verification of the new path, where the target path is obtained by filtering, by the service end, a plurality of candidate paths.

In an embodiment, the first connection identification frame and the second connection identification frame are located in a same packet number space, different candidate communication addresses are located in different second connection identification frames, and different second connection identification frames carry different sequence numbers.

In an embodiment, the client end further includes:
- a path verification frame receiving unit, configured to receive a path verification frame sent by the service end through the new path; and
- a path filtering unit, configured to, in response to the path verification frame sent by the service end, filter the target path from the plurality of candidate paths, and feed back the path response frame to the service end through the target path, to complete downlink verification of the new path.

In an embodiment, the path filtering unit is specifically configured to calculate a path latency of each of the plurality of candidate paths, and determining a path corresponding to a minimum path latency as the filtered target path.

In an embodiment, the first connection identification frame, the second connection identification frame, the path verification frame and the path response frame are located in a same packet number space.

In an embodiment, the new path and the target path both comprise an uplink path and a downlink path, the client end sends the path verification frame to the service end through the uplink path of the new path, and the client end receives the path response frame sent by the service end through the downlink path of the target path.

In an embodiment, each of the plurality of candidate paths comprises an uplink path and a downlink path, and the target path is obtained by filtering, by the service end, candidate downlink paths.

In an embodiment, the client end further includes:
- a path verification frame receiving unit, configured to receive a path verification frame sent by the service end through the new path; and
- an uplink path filtering unit, configured to, in response to the path verification frame sent by the service end, filter an optimal uplink path from candidate uplink paths, and feed back the path response frame to the service end through the optimal uplink path, to complete the downlink verification of the new path.

In an embodiment, the uplink path filtering unit is specifically configured to calculate a path latency of each of the candidate uplink paths, and determine an uplink path corresponding to a minimum path latency as the filtered optimal uplink path.

For the specific processing logic of each functional module, reference may be made to the description of the foregoing method embodiments, and details are not repeated here.

Each unit illustrated in the above embodiments may be specifically implemented by a computer chip, or may be implemented by a product with a certain function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or any combination of these devices.

For the convenience of description, when describing the above device, various units are described separately according to functions. Of course, when implementing the present application, the functions of each unit may be implemented in the same or multiple pieces of software and/or hardware.

Figure 5:
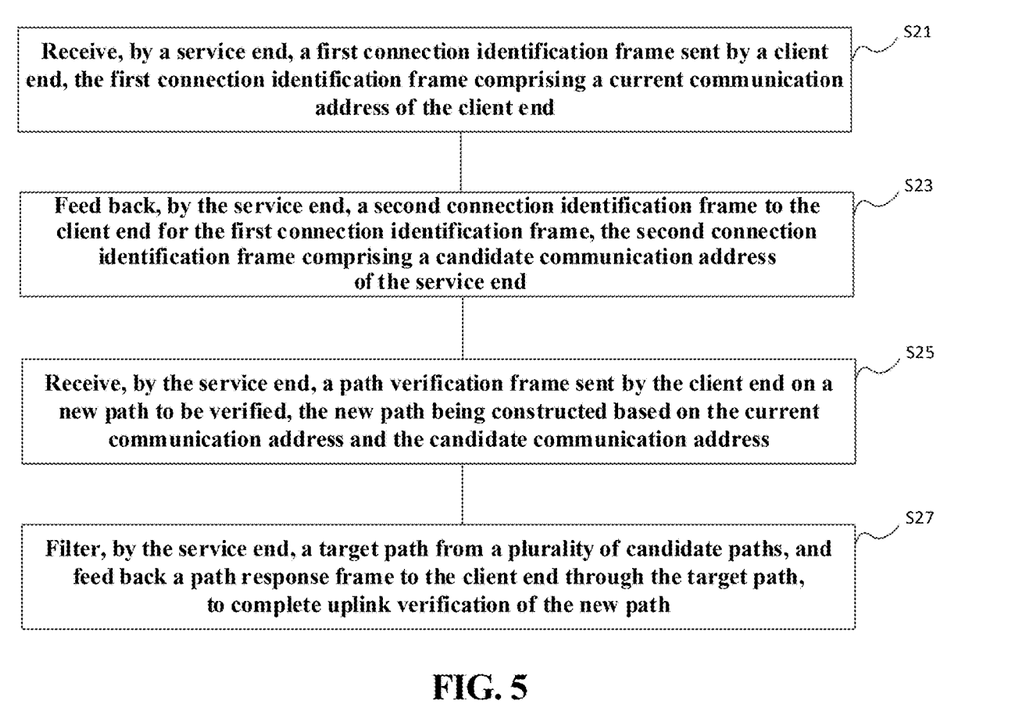
FIG. 5 is a schematic diagram of steps of a path verification method in a content delivery network performed by a service end according to embodiments of the present disclosure.

Referring to FIG. 5, embodiments of the present disclosure further provide a path verification method in a content delivery network. The method may be performed by a service end, and the method may include the following steps.

S21: receiving, by a service end, a first connection identification frame sent by a client end, the first connection identification frame comprising a current communication address of the client end;

S23: feeding back, by the service end, a second connection identification frame to the client end for the first connection identification frame, the second connection identification frame comprising a candidate communication address of the service end;

S25: receiving, by the service end, a path verification frame sent by the client end on a new path to be verified, the new path being constructed based on the current communication address and the candidate communication address; and S27: filtering, by the service end, a target path from a plurality of candidate paths, and feeding back a path response frame to the client end through the target path, to complete uplink verification of the new path.

For the specific implementation of each step, reference may be made to the description in the foregoing embodiments, and details are not repeated here.

Figure 6:
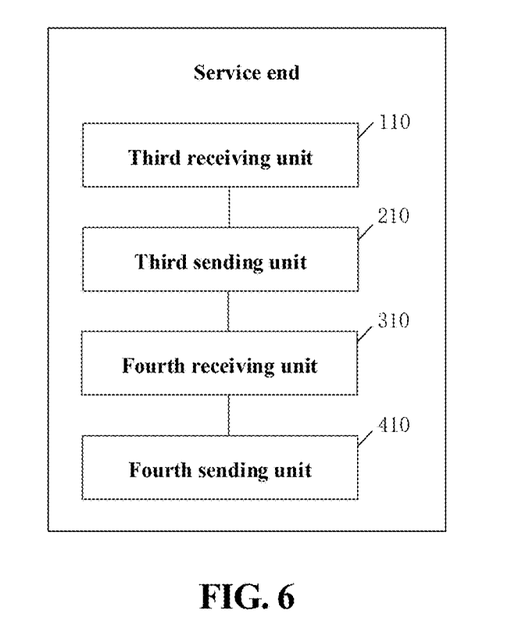
FIG. 6 is a schematic diagram of functional modules of a service end according to embodiments of the present disclosure.

Referring to FIG. 6, embodiments of the present disclosure further provide a service end. The service end includes:

a third receiving unit 110, configured to receive a first connection identification frame sent by a client end, the first connection identification frame comprising a current communication address of the client end;

a third sending unit 210, configured to feed back a second connection identification frame to the client end for the first connection identification frame, the second connection identification frame comprising a candidate communication address of the service end;

a fourth receiving unit 310, configured to receive a path verification frame sent by the client end on a new path to be verified, the new path being constructed based on the current communication address and the candidate communication address; and a fourth sending unit 410, configured to filter a target path from a plurality of candidate paths, and feed back a path response frame to the client end through the target path, to complete uplink verification of the new path.

For the specific processing logic of each functional module, reference may be made to the description of the foregoing method embodiments, and details are not repeated here.

Each unit illustrated in the above embodiments may be specifically implemented by a computer chip, or may be implemented by a product with a certain function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or any combination of these devices.

For the convenience of description, when describing the above device, various units are described separately according to functions. Of course, when implementing the present application, the functions of each unit may be implemented in the same or multiple pieces of software and/or hardware.

Figure 7:
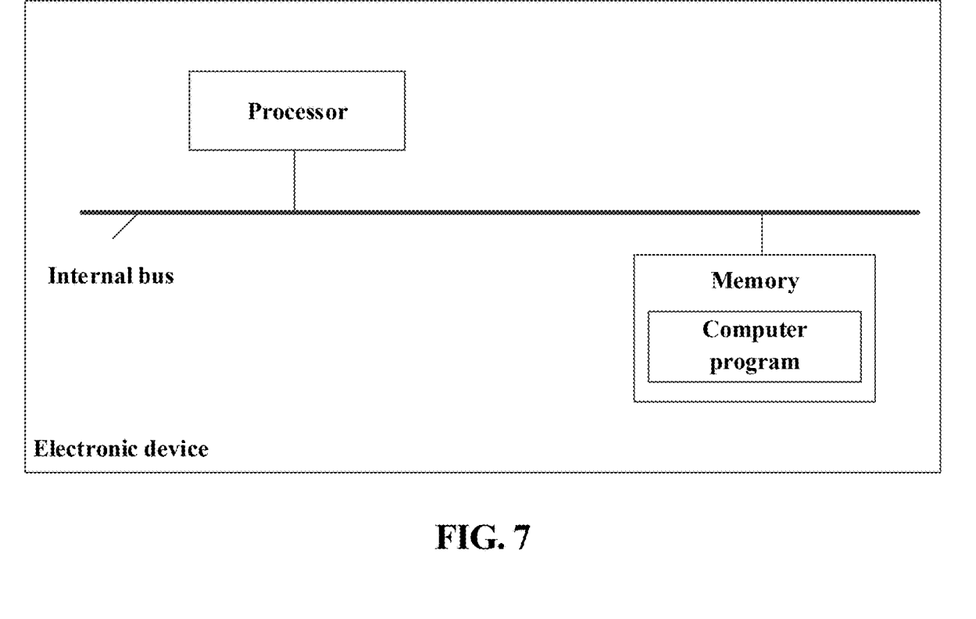
FIG. 7 is a schematic diagram of a structure of an electronic device according to embodiments of the present disclosure.

Referring to FIG. 7, embodiments of the present disclosure further provides an electronic device. The electronic device includes a memory and a processor, the memory is configured to store a computer program, and the computer program, when executed by the processor, implements the path verification method in the content delivery network described above.

The present disclosure further provides a computer-readable storage medium. The computer-readable storage medium is configured to store a computer program, and the computer program, when executed by a processor, implements the path verification method in the content delivery network described above.

The processor may be a Central Processing Unit (CPU). The processor may also be other general-purpose processors, Digital Signal Processors (DSPs), Application Specific Integrated Circuits (ASICs), Field-Programmable Gate Arrays (FPGAs) or other programmable logic devices, discrete gate or transistor logic devices, discrete hardware components, or a combination of the above chips.

The memory, as a non-transitory computer-readable storage medium, may be used to store a non-transitory software program, a non-transitory computer-executable program and modules, such as program instructions/modules corresponding to the method in the embodiments of the present disclosure. The processor executes various functional applications and data processing of the processor by running the non-transitory software program, instructions and modules stored in the memory, that is, the method in the above method embodiments is implemented.

The memory may include a program storage region and a data storage region, where the program storage region may store an operating system and application programs required for at least one function; and the data storage region may store data created by the processor, and so on. In addition, the memory may include a high-speed random access memory, and may also include a non-transitory memory, such as at least one magnetic disk storage device, flash memory device, or other non-transitory solid-state storage device. In some embodiments, the memory optionally includes a memory provided remotely relative to the processor, and these remote memories may be connected to the processor through a network. Examples of the above network include but are not limited to the Internet, an intranet, a local area network, a mobile communication network, and a combination thereof.

It can be understood by those skilled in the art that all or part of the processes in the above method embodiments may be completed by a computer program instructing relevant hardware, and the program may be stored in a computer-readable storage medium, and when the program is executed, the processes of the above method embodiments may be included. The storage medium may be a magnetic disk, an optical disc, a read-only memory (ROM), a random access memory (RAM), a flash memory, a hard disk (HDD), a solid-state drive (SSD), or the like; and the storage medium may also include a combination of the above kinds of memories.

The various embodiments in this specification are described in a progressive manner, and the same or similar parts between the embodiments may be referred to each other, and each embodiment focuses on the differences from other embodiments. In particular, for the embodiments of the client end, the service end, the device, and the storage medium, since they are basically similar to the method embodiments, the description is relatively simple, and the relevant parts can be referred to the description of the method embodiments.

The above are only embodiments of the present application, and are not intended to limit the present application. For those skilled in the art, the present application may have various changes and modifications. Any modifications, equivalent substitutions, improvements, etc. made within the spirit and principles of the present application shall be included in the scope of the claims of the present application.

Although the embodiments of the present disclosure have been described in combination with the drawings, those skilled in the art may make various modifications and variations without departing from the spirit and scope of the present disclosure, and such modifications and variations fall within the scope defined by the appended claims.

The invention claimed is:

1. A path verification method in a content delivery network, comprising:
sending, by a client end, a first connection identification frame to a service end, the first connection identification frame comprising a current communication address of the client end;
receiving, by the client end, a second connection identification frame fed back by the service end for the first connection identification frame, the second connection identification frame comprising a candidate communication address of the service end;
sending, by the client end, a path verification frame to the service end on a new path constructed based on the current communication address and the candidate communication address, wherein the path verification frame is used to verify whether the new path from the current communication address to the candidate communication address satisfies a communication requirement; and
receiving, by the client end, a path response frame fed back by the service end through a target path obtained by filtering, to complete uplink verification of the new path, wherein the target path is obtained by filtering, by the service end, a plurality of candidate paths, the target path is constructed based on the current communication address of the client end and a further communication address of the service end, and the further communication address is different from the candidate communication address.

2. The method according to claim 1, wherein the first connection identification frame and the second connection identification frame are located in a same packet number space, different candidate communication addresses are located in different second connection identification frames, and different second connection identification frames carry different sequence numbers.

3. The method according to claim 1, wherein after completing the uplink verification of the new path, the method further comprises:
receiving, by the client end, a path verification frame sent by the service end through the new path; and
in response to the path verification frame sent by the service end, filtering the target path from the plurality of candidate paths, and feeding back the path response frame to the service end through the target path, to complete downlink verification of the new path.

4. The method according to claim 3, wherein filtering the target path from the plurality of candidate paths comprises:
calculating a path latency of each of the plurality of candidate paths, and determining a path corresponding to a minimum path latency as the filtered target path.

5. The method according to claim 1, wherein the first connection identification frame, the second connection identification frame, the path verification frame and the path response frame are located in a same packet number space.

6. The method according to claim 1, wherein the new path and the target path both comprise an uplink path and a downlink path, the client end sends the path verification frame to the service end through the uplink path of the new path, and the client end receives the path response frame sent by the service end through the downlink path of the target path.

7. The method according to claim 1, wherein each of the plurality of candidate paths comprises an uplink path and a downlink path, and the target path is obtained by filtering, by the service end, candidate downlink paths.

8. The method according to claim 7, wherein after completing the uplink verification of the new path, the method further comprises:
receiving, by the client end, a path verification frame sent by the service end through the new path; and
in response to the path verification frame sent by the service end, filtering an optimal uplink path from candidate uplink paths, and feeding back the path response frame to the service end through the optimal uplink path, to complete the downlink verification of the new path.

9. The method according to claim 8, wherein filtering the optimal uplink path from the candidate uplink paths comprises:
calculating a path latency of each of the candidate uplink paths, and determining an uplink path corresponding to a minimum path latency as the filtered optimal uplink path.

10. A path verification method in a content delivery network, comprising:
receiving, by a service end, a first connection identification frame sent by a client end, the first connection identification frame comprising a current communication address of the client end;
feeding back, by the service end, a second connection identification frame to the client end for the first connection identification frame, the second connection identification frame comprising a candidate communication address of the service end;
receiving, by the service end, a path verification frame sent by the client end on a new path to be verified, the new path being constructed based on the current communication address and the candidate communication address; and
filtering, by the service end, a target path from a plurality of candidate paths, and feeding back a path response frame to the client end through the target path, to complete uplink verification of the new path.

11. The method according to claim 10, wherein the first connection identification frame and the second connection identification frame are located in a same packet number space, different candidate communication addresses are located in different second connection identification frames, and different second connection identification frames carry different sequence numbers.

12. An electronic device, comprising a memory and a processor, the memory being configured to store a computer program, the computer program, when executed by the processor, causing the electronic device to:
send a first connection identification frame to a service end, the first connection identification frame comprising a current communication address of a client end;
receive a second connection identification frame fed back by the service end for the first connection identification frame, the second connection identification frame comprising a candidate communication address of the service end;

send a path verification frame to the service end on a new path constructed based on the current communication address and the candidate communication address, wherein the path verification frame is used to verify whether the new path from the current communication address to the candidate communication address satisfies a communication requirement; and receive a path response frame fed back by the service end through a target path obtained by filtering, to complete uplink verification of the new path, wherein the target path is obtained by filtering, by the service end, a plurality of candidate paths, the target path is constructed based on the current communication address of the client end and a further communication address of the service end, and the further communication address is different from the candidate communication address.

13. The electronic device according to claim 12, wherein the first connection identification frame and the second connection identification frame are located in a same packet number space, different candidate communication addresses are located in different second connection identification frames, and different second connection identification frames carry different sequence numbers.

14. The electronic device according to claim 12, wherein the computer program further causes the electronic device to, after completing the uplink verification of the new path:

receive a path verification frame sent by the service end through the new path; and in response to the path verification frame sent by the service end, filter the target path from the plurality of candidate paths, and feed back the path response frame to the service end through the target path, to complete downlink verification of the new path.

15. The electronic device according to claim 14, wherein the computer program causing the electronic device to filter the target path from the plurality of candidate paths further causes the electronic device to:

calculate a path latency of each of the plurality of candidate paths, and determine a path corresponding to a minimum path latency as the filtered target path.

16. The electronic device according to claim 12, wherein the first connection identification frame, the second connection identification frame, the path verification frame and the path response frame are located in a same packet number space.

17. The electronic device according to claim 12, wherein the new path and the target path both comprise an uplink path and a downlink path, the path verification frame is sent to the service end through the uplink path of the new path, and the path response frame sent by the service end is received through the downlink path of the target path.

18. The electronic device according to claim 12, wherein each of the plurality of candidate paths comprises an uplink path and a downlink path, and the target path is obtained by filtering, by the service end, candidate downlink paths.

19. The electronic device according to claim 18, wherein the computer program further causes the electronic device to, after completing the uplink verification of the new path:

receive a path verification frame sent by the service end through the new path; and in response to the path verification frame sent by the service end, filter an optimal uplink path from candidate uplink paths, and feed back the path response frame to the service end through the optimal uplink path, to complete the downlink verification of the new path.

20. The electronic device according to claim 19, wherein the computer program causing the electronic device to filter the optimal uplink path from the candidate uplink paths further causes the electronic device to:

calculate a path latency of each of the candidate uplink paths, and determine an uplink path corresponding to a minimum path latency as the filtered optimal uplink path.

* * * * *